UNITED STATES PATENT OFFICE.

WILHELM SCHIEBER, OF VIENNA, AUSTRIA-HUNGARY, ASSIGNOR TO THE FIRM OF BERNDORFER METALLWAAREN-FABRIK ARTHUR KRUPP, OF BERNDORF, AUSTRIA-HUNGARY.

METHOD OF WELDING COPPER OR NICKEL AND COPPER OR NICKEL ALLOY.

1,013,620.        Specification of Letters Patent.        Patented Jan. 2, 1912.

No Drawing.        Application filed March 21, 1911. Serial No. 615,869.

*To all whom it may concern:*

Be it known that I, WILHELM SCHIEBER, subject of the Emperor of Austria-Hungary, residing at Vienna, Austria-Hungary, have invented certain new and useful Improvements in Methods of Welding Copper or Nickel and Copper or Nickel Alloys, of which the following is a specification.

This invention has for object to provide a new or improved method of welding copper or nickel and copper or nickel alloys.

In autogenous welding as hitherto practiced the juxtaposed edges of the pieces of metal to be welded are heated until they fuse and unite, by means of a blow pipe flame which is fed with acetylene, hydrogen, water gas or illuminating gas and with air or oxygen. During the operation wire of the same metal as that being welded is generally simultaneously melted and allowed to fall in drops onto the part to be welded, after the manner of a solder. Autogenous welding in this manner suffices for many purposes where the principal point of importance is that the welded joint shall be tight and identical in its chemical composition with the metal on both sides thereof. So far, however, as the welding of sheet metal, metal bars, metal wire, etc., is concerned, all these known methods of welding are unsatisfactory. Those mechanical properties of the metal which are of much greater importance technically than tightness of the welded joint and identity of chemical composition thereof, particularly tensile strength, flexibility, capacity of elongation and hardness, are always of lower value in the parts acted upon in the welding operation and mostly to a considerable degree in the welded joint itself than in those parts of the metal not under the influence of the welding flame. The reason for this is that sheet metal, metal wire, etc., owing to the repeated intense kneading action to which it is subjected during the rolling and drawing processes in the course of manufacture always possess more technically favorable mechanical properties than castings of the same chemical composition. This difference between wrought and cast metal is very considerable in the case of nickel and copper as well as in alloys of these metals. When sheet or wire, etc., of nickel and copper or of alloys of these metals are welded as heretofore usual the center of the welded joint consists therefore of metal which is of inferior quality, for it is cast metal, while the other parts of the welded article remain as before the operation and are therefore of superior quality because they are rolled or drawn. Experiments have shown that, even by a hammering of the welded joint immediately after the welding operation, this difference in quality can only be but slightly reduced. Now, according to this invention, this disadvantage is obviated by completely avoiding any fusion of the edges to be welded and by heating them in a special manner to softening point only and finally uniting them by hammering or pressing. In this new or improved method of welding a special manner of heating is unavoidably necessary because if an ordinary blast flame be employed the welded joints undergo chemical change and become superficially oxidized, the superficial film of oxid so formed preventing any union at all. For the purpose of obviating this oxidation when welding nickel or nickel alloys as well as copper and its alloys, it has been proposed to employ hydrogen or volumes of gases containing hydrogen, with air or oxygen and to heat the part which is being welded at any particular time alternately, first to softening point ignoring oxidation and then after having softened the edges to destroy the film of oxid formed, by a flame of pure hydrogen or volumes of gases containing hydrogen which now no longer acts as a heating flame but exclusively as a reducing flame. In this operation it is therefore necessary to direct upon each article first an ordinary and therefore an oxidizing flame and then a reducing flame which necessitates a constant reversal of the regulating devices for the gases supplied. This manipulation of the gas regulating devices which is complex and requires great experience and dexterity, is avoided in welding according to the present invention in that by a suitable selection of the composition of the gas mixture issuing from the welding burner a single flame of constant composition can be employed throughout the whole period of welding. The edges to be welded are therefore heated to welding temperature with only a single uniform flame which always contains an excess of hydrogen over and above the mixing ratio $H_2$ to $O$ and are united immediately afterward by blows or pressure. If the mechanical properties of the sheet metal, metal wire, etc., are to be maintained in the welded joint also, it is necessary for this purpose to have a flame which contains hydrogen as the important combustible constituent. Combustible gases containing carbon would act injuriously owing to the carbon being taken up by the glowing metal.

Claim:

Method of welding copper, or nickel and copper, or nickel alloys, consisting in first heating the parts to be welded to welding temperature by a flame consisting of hydrogen and oxygen in such proportions that the hydrogen exceeds the ratio $H_2:O$, and then uniting the parts by hammering or pressing immediately after the heating.

In testimony whereof I have hereunto set my hand in presence of two subscribing witnesses.

WILHELM SCHIEBER.

Witnesses:
 JOSEF RUBRANK,
 EUGENE A. FUGGER.